(12) United States Patent
Mc Kee et al.

(10) Patent No.: US 6,573,329 B2
(45) Date of Patent: Jun. 3, 2003

(54) PREPARATION OF MICROSUSPENSION POLYMERS USEFUL AS COATING MATERIALS

(75) Inventors: Graham Edmund Mc Kee, Neustadt (DE); Maximilian Bendix, Münster (DE); Peter Barghoorn, Kallstadt (DE); David Christie, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 46 days.

(21) Appl. No.: 09/873,344

(22) Filed: Jun. 5, 2001

(65) Prior Publication Data

US 2002/0193505 A1 Dec. 19, 2002

(30) Foreign Application Priority Data

Jun. 6, 2000 (DE) .......................................... 100 27 860

(51) Int. Cl.$^7$ .............................. C08J 3/00; C08K 3/20; C08L 75/00; C08F 8/30; C08F 283/04
(52) U.S. Cl. ........................ 524/589; 524/507; 524/590; 524/591; 524/839; 524/840; 525/124; 525/455
(58) Field of Search ................................. 527/507, 591, 527/839, 840, 589, 590; 525/124, 455

(56) References Cited

U.S. PATENT DOCUMENTS 4,444,954 A  4/1984  Mels et al. ................. 525/124
5,889,111 A  3/1999  McKee et al. ................. 525/64
6,277,910 B1 *  8/2001  Rassing et al.

FOREIGN PATENT DOCUMENTS

DE           198 02 094           1/1998

* cited by examiner

Primary Examiner—Patrick D. Niland
(74) Attorney, Agent, or Firm—Keil & Weinkauf

(57) ABSTRACT

Microsuspension polymers are prepared by
(1) dispersing a mixture of components A1 to A4,
  a1: from 0.1 to 60% by weight of at least one free-radically polymerizable monomer A1 containing at least one functional group which is reactive with isocyanate groups (isocyanate-reactive functional group),
  a2: from 40 to 99.9% by weight of at least one further free-radically polymerizable monomer A2 containing no isocyanate-reactive functional group,
  a3: from 0 to 20% by weight of 1,1-diphenylethene or 1,1-diphenylethane A3,
  a4: from 0.1 to 100% by weight of at least one blocked polyisocyanate A4,
  in water using a protective colloid to form a dispersion having an average particle diameter of from 0.08 to 100 μm, and
(2) polymerizing the droplets using from 0.1 to 20% by weight of at least one free-radical polymerization initiator, up to a conversion of at least 50% by weight, the amounts being based on the total weight of components A1 and A2, which gives 100% by weight.

7 Claims, No Drawings

PREPARATION OF MICROSUSPENSION POLYMERS USEFUL AS COATING MATERIALS

The invention relates to a process for preparing microsuspension polymers which are suitable for preparing coating materials. The invention also relates to the microsuspension polymers and to their use to produce fibers, moldings, films or coating materials, and also to the fibers, moldings, films or coating materials produced from them.

In the preparation of particulate addition polymers, microsuspension polymerization techniques are increasingly finding application alongside emulsion polymerization. In microsuspension polymerization, monomers or monomer mixtures are dispersed in water using protective colloids to form a dispersion and are subsequently polymerized using a hydrophobic free-radical polymerization initiator. DE-A-198 02 094 describes such a process with which elastomeric microsuspension (graft) polymers are obtained. By this means it is possible to obtain relatively large polymer particles. U.S. Pat. No. 5,889,111 describes the preparation of graft copolymers in which the graft core has an average particle diameter of from 1 to 150 μm. The preparation takes place by the microsuspension polymerization technique.

The elastomeric polymer particles obtained are used for impact modification of thermoplastic molding compounds.

It is an object of the present invention to provide microsuspension polymers crosslinkable by heating to a temperature of above 80° C. Dispersions of the microsuspension polymers are to be suitable for coating applications and for molding compounds which may be processed by injection molding, extrusion, thermoforming or compression molding and which crosslink to moldings during or after processing.

We have found that this object is achieved in accordance with the invention by a process for preparing microsuspension polymers by
(1) dispersing a mixture of components A1 to A4,
   a1: from 0.1 to 60% by weight of at least one free-radically polymerizable monomer A1 containing at least one functional group which is reactive with isocyanate groups (isocyanate-reactive functional group),
   a2: from 40 to 99.9% by weight of at least one further free-radically polymerizable monomer A2 containing no isocyanate-reactive functional group,
   a3: from 0 to 20% by weight of 1,1-diphenylethene or 1,1-diphenylethane A3,
   a4: from 0.1 to 100% by weight of at least one blocked polyisocyanate A4,
   in water using a protective colloid to form a dispersion having an average particle diameter of from 0.08 to 100 μm, and
(2) polymerizing the droplets using from 0.1 to 20% by weight of at least one free-radical polymerization initiator, up to a conversion of at least 50% by weight,
the amounts being based on the total weight of components A1 and A2, which gives 100% by weight.

We have also found that the object is achieved by microsuspension polymers or dispersions thereof which may be prepared by this process.

By way of the microsuspension polymerization technique it is possible to carry out the polymerization with high monomer concentrations and high conversions without the dissipation of the developing heat of reaction becoming critical. Unlike polymerization in bulk or in solution, therefore, the polymerization system is easy to manage.

It is therefore also possible to operate with high initiator concentrations, thereby achieving rapid polymerization.

First of all, the individual components of the reaction system will be described in more detail.

All amounts by weight (% by weight) relate below to the total weight of components A1 and A2, which gives 100% by weight.

The free-radically polymerizable monomer A1 is used preferably in an amount of from 5 to 50% by weight, with particular preference from 10 to 40% by weight. The monomer A1 preferably contains at least one hydroxyl, primary or secondary amino, epoxy or carboxyl group. A secondary amino group preferably has a $C_{1-20}$ alkyl radical, preferably $C_{1-6}$ alkyl radical. In the epoxy group, the carbon atoms forming the epoxide ring may be substituted independently of one another by $C_{1-20}$ alkyl radicals, preferably $C_{1-6}$ alkyl radicals. The carboxyl group is preferably in the form of the carboxylic acid group —COOH. Preferably, the monomer has precisely one of said functional groups.

Examples of suitable monomers are hydroxyalkyl acrylates and hydroxyalkyl methacrylates of 1 to 20 carbon atoms, preferably 1 to 8 carbon atoms, in the alkyl group. Said alkyl group may be linear or branched. Examples are hydroxymethyl (meth)acrylate and hydroxybutyl (meth)acrylate. Further suitable monomers are propylene glycol (meth)acrylate and butanediol monoacrylate, glycidyl (meth)acrylate, (meth)acrylic acid, tert-butylaminoethyl (meth)acrylate, dimethyl-aminoethyl acrylate, dimethylaminoethyl methacrylate, 3-chloro-2-hydroxypropyl (meth)acrylate, N-hydroxymethacrylamide, N-hydroxymethylmethacrylamide and 2-acrylamido-2-methylpropanesulfonic acid. Preference is given to hydroxy (methyl) methacrylates, especially hydroxypropyl methacrylate.

The monomer A2 is present preferably in an amount of from 50 to 95% by weight, with particular preference from 60 to 90% by weight. Preferred monomers A2 are selected from $C_{1-16}$ alkyl (meth)acrylates, unsubstituted or substituted styrene, acrylonitrile and mixtures thereof. In preferred alkyl (meth)acrylates, the alkyl radical has 1 to 8 carbon atoms. Examples are methyl methacrylate, butyl acrylate and ethylhexyl acrylate. Substituted styrenes may be substituted either in the ring or at the double bond; examples are p-methylstyrene and α-methylstyrene. Preferred monomers A2 are methyl methacrylate, butyl acrylate, ethylhexyl acrylate and styrene.

As monomers A2 it is also possible, moreover, to use monomers having two or more polymerizable double bonds, such as butadiene, isoprene, divinyl esters of dicarboxylic acids, divinylbenzene and triallyl cyanurate or, with particular preference, dihydrodicyclopentadienyl acrylate. The fraction of these crosslinkers as a proportion of the total amount of the monomers A2 is preferably from 0 to 3% by weight, where they are present.

The monomer mixture may contain up to 20% by weight, preferably up to 4% by weight, with particular preference up to 3% by weight, of 1,1-diphenylethene (DPE) or diphenylethane (DPA). This compound results in a slower and smoother course of the polymerization and may be used with advantage especially in the case of a batch reaction. Furthermore, the use of DPE or DPA leads to a reduction in the molecular weight of the polymer, which is particularly advantageous in the context of the preparation of thin films and coating materials which are to be crosslinked subsequently. The same applies to low molecular mass polymers which are to be crosslinked after processing (for example, following injection molding).

Used as component A4 are from 0.1 to 100% by weight, preferably from 2 to 80% by weight, in particular from 20 to 70% by weight, of blocked polyisocyanates. The polyisocyanates have 2 or more isocyanate groups, preferably from 2 to 10 isocyanate groups.

Suitable blocking agents for preparing component A4 are described, for example, in U.S. Pat. No. 4,444,954:

i) phenols such as phenol, cresol, xylenol, nitrophenol, chlorophenol, ethylphenol, t-butylphenol, hydroxybenzoic acid, esters of this acid, or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate, or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutyl-amine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, especially dimethylpyrazole, or triazoles; and also xvii) mixtures of these blocking agents, especially dimethylpyrazole and triazoles, malonic esters and acetoacetic esters or dimethylpyrazole and succinimide.

Examples of suitable organic polyisocyanates for blocking are especially the so-called paint polyisocyanates containing isocyanate groups attached to aliphatic, cycloaliphatic, araliphatic and/or aromatic moieties. Preference is given to polyisocyanates having from 2 to 5 isocyanate groups per molecule and having viscosities of from 100 to 10,000, preferably from 100 to 5000.

Further examples of suitable polyisocyanates for blocking are described in "Methoden der organischen Chemie", Houben-Weyl, Volume 14/2, 4th edition, Georg Thieme Verlag, Stuttgart 1963, pages 61 to 70, and by W. Siefken, Liebigs Annalen der Chemie, Volume 562, pages 75 to 136. Suitable examples are the isocyanato-containing polyurethane prepolymers which may be prepared by reacting polyols with an excess of polyisocyanates and which are preferably of low viscosity.

Further examples of suitable polyisocyanates for blocking are polyisocyanates containing isocyanurate, biuret, allophanate, iminooxadiazinedione, urethane, urea and/or uretdione groups. Polyisocyanates containing urethane groups, for example, are obtained by reacting some of the isocyanate groups with polyols, such as trimethylolpropane and glycerol, for example. Preference is given to the use of aliphatic or cycloaliphatic polyisocyanates, especially hexamethylene diisocyanate, dimerized and trimerized hexamethylene diisocyanate, dicyclohexylmethane 2,4'-diisocyanate, dicyclohexylmethane 4,4'-diisocyanate, diisocyanates derived from dimeric fatty acids, as sold under the commercial designation DDI 1410 by Henkel and described in WO 97/49745 and WO 97/49747, especially 2-heptyl-3,4-bis(9-isocyanatononyl)-1-pentylcyclohexane; or 1,2-, 1,4- or 1,3-bis(isocyanatomethyl)cyclohexane, 1,2-, 1,4- or 1,3-bis(2-isocyanatoeth-1-yl)-cyclohexane, 1,3-bis(3-isocyanatoprop-1-yl)cyclohexane or 1,2-, 1,4- or 1,3-bis(4-isocyanatobut-1-yl)cyclohexane, 1,8-diisocyanato-4-isocyanatomethyloctane, 1,7-diisocyanato-4-isocyanatomethylheptane or 1-isocyanato-2-(3-isocyanatopropyl)cyclohexane or mixtures of these polyisocyanates.

Particular preference is given to using a blocked cycloaliphatic polyisocyanate as sold, for example, under the designation Crelan® VPLS 2292 by Bayer.

The polymerization is started using initiators which form free radicals. The amount of initiator is from 0.1 to 20% by weight, preferably from 0.1 to 15% by weight, with particular preference from 0.3 to 12% by weight.

Examples of suitable initiators are peroxides, azo compounds and C—C-labile compounds. Examples of suitable initiators are described in "Initiators for high polymers", published by Akzo Nobel. Preferred polymerization initiators are soluble in the mixture of the monomers A1 and A2 and have a half-life of 10 hours at a temperature in the range from 25 to 150° C. Preferred suitable initiators are dilauryl peroxide, diisobutanoyl peroxide, cumyl peroxyneodecanoate, 2,4,4-trimethyl-2-pentyl peroxyneodecanoate, tert-amyl peroxyneodecanoate, bis(4-tert-butylcyclohexyl) peroxydicarbonate, diethyl peroxydicarbonate, dimyristyl peroxydicarbonate, tert-butyl peroxypivalate and azobisisobutyronitrile. The polymerization temperature is preferably below 100° C., with particular preference below 90° C., in particular below 80° C., in order to prevent premature crosslinking between the polyisocyanate A4 and the component A1. It is also possible, for example, to use a redox system as initiator, in order to be able to carry out polymerization at low temperatures. To prepare polymers of low molecular weight, it is preferred to use high concentrations of initiator.

The reaction is preferably run to a conversion of at least 50% by weight, preferably at least 90% by weight, with particular preference at least 95% by weight.

The reaction mixture may further include molecular weight regulators, such as ethylhexyl thioglycolate or tert-dodecyl mercaptan. It is also possible to use cobalt compounds such as cobalt oxime borofluoride, tetravinylcobalt oxime borofluoride or cobalt diacetyl dioxime boron trifluoride. Molecular weight regulators of this kind are described, for example, in Macromolecules 30 (1997) 7661. The cobalt compounds are used preferably in combination with an azo compound as polymerization initiator.

The operation of dispersing the components A1 to A4 in water is generally conducted at a temperature in the range from 0 to 100° C., preferably at room temperature. The fraction of components A1 to A4, based on the overall dispersion, is from 10 to 80% by weight, preferably from 50 to 70% by weight, with particular preference from 20 to 60% by weight.

In accordance with the invention, protective colloids are used to stabilize the dispersion. Suitable protective colloids are described, for example, in DE-A-198 02 094 and U.S. Pat. No. 5,889,111.

Suitable examples include cellulose derivatives such as carboxymethylcellulose and hydroxylmethylcellulose, poly-N-vinylpyrrolidone, polyvinyl alcohol, polyethylene oxide, anionic polymers, such as polyacrylic acid and cationic polymers, such as poly-N-vinylimidazole. The amount of the protective colloids is preferably from 0.1 to 10% by weight, with particular preference from 0.2 to 5% by weight, based on the components A1 to A4 for emulsification. In addition to the protective colloids, it is in addition also possible to use low molecular mass surface-active compounds, for example compounds of the type of the anionic or cationic soaps. When soaps of this kind are used, relatively small polymer particles are obtained. Examples of such soaps are sodium, potassium or ammonium salts of $C_{10-30}$ sulfonic acids and $C_{10-30}$ fatty acids. It is also possible to use protective colloids or soaps which, like component A1, contain isocyanate-reactive functional groups and via which they are able to react with the blocked isocyanates. Examples are polyvinyl alcohols or fatty acids. Preference is also given to graftable protective colloids and soaps which after grafting are unable to diffuse from the products. Examples of such are polyvinyl alcohol and also oleic acid and its salts.

To prepare the dispersion of components A1 to A4, these components are emulsified under high-shear conditions with water, protective colloid and, if used, soap and, if desired, further additives. Methods of obtaining high shear forces are known to the skilled worker. They may be obtained, for example, by means of intensive stirring, shearing with a rotor-stator system, homogenization with ultrasound or using a pressure homogenizer, in which the mixture of substances to be emulsified is pressed under high pressure through a narrow gap or narrow nozzles. Suitable stirrers and homogenizers are, for example, the Labor Dissolver Dispermat from VMA Getzmann, Reichshof (DE), the Ultra-Turrax from Janke and Kunkel, Staufen (DE), the Cavitron homogenizer from Hagen and Funke, Sprockhövel (DE), and pressure homogenizers from Gaulin, Lübeck (DE).

The stirrers are usually operated at speeds of from 1000 to 30,000 revolutions per minute, preferably from 2000 to 15,000 revolutions per minute, with a stirring time of 0.1 second to several hours. The emulsion to be polymerized may be prepared continuously or batchwise. For a further description of the emulsification, reference may be made to WO 98/49204.

There is preferably a broad particle size distribution in the dispersion.

The average particle sizes obtained (i.e., 50% by volume of particles are larger and 50% by volume are smaller than this particle size) are preferably in the range from 0.3 to 100 μm, with particular preference from 0.4 to 20 μm, in particular from 0.5 to 10 μm.

Very small particles (<0.5 μm) have the advantage that the polymerization takes place more quickly than in the case of larger particles. Moreover, these particles do not settle out when the dispersion is left to stand. Relatively large particles (>0.5 μm) are easier to handle during blending with further components, and cause less dust when processed in dry form.

The broad distribution of the dispersions leads to better coating properties, since during the drying of the coating material the small particles are able to lodge themselves in the spaces between the large particles.

The microsuspension polymers of the invention or dispersions thereof may be used to produce fibers, moldings, films or coating materials. The invention additionally provides such fibers, moldings, films or coating materials.

The invention further provides a method of coating substrates by coating them with a microsuspension polymer dispersion as described above, drying them and heating them to a temperature above 80° C.

For coating, the dispersion obtained from the polymerization may be used directly. Alternatively, it may be concentrated, modified or provided with additives as are customary for coating applications.

Crosslinking of the polymer particles is possible as a result of the complementary functional groups of components A1 and A4. Crosslinking preferably takes place at temperatures above 80° C. By heating the dispersion before, during or after the polymerization, or following application and drying of the dispersion on a substrate, crosslinking of the particles and within the particles may be brought about. By this means it is possible to obtain coatings possessing advantageous properties.

The invention is illustrated below with reference to examples.

EXAMPLES

The experiments were carried out using the following substances:

Deionized water was used.

Methyl methacrylate (MMA), n-butyl acrylate (BA) and styrene (St) are products of BASF and were used without further purification.

Polyvinyl alcohol (PVA) of the type Mowiol® 8–88 is a product of Hoechst AG, Frankfurt am Main, Del. The first number behind the brand name indicates the viscosity of a 4% strength by weight solution of the PVA in water at 20° C. in mPa/s, measured in accordance with DIN 53015. The second number characterizes the degree of hydrolysis of the polyvinyl alcohol in mol %.

The polymerization initiators are standard commercial products.

The blocked cycloaliphatic polyisocyanate has the trade name Crelan® VPLS 2292 and is supplied by Bayer.

The diphenylethene (DPE) is supplied by Merck Schuchardt, DE, and was used without further purification.

The hydroxypropyl methacrylate (HPMA) was from Laporte Performance Chemicals, GB, and was used without further purification.

The soap, the potassium salt of a $C_{12-18}$ paraffin sulfonic acid (Emulgator K30), was used as a 40% strength solution in water.

The particle size distribution was determined by means of Fraunhofer laser diffraction using a Malvern Master Sizer instrument from Malvern Instruments, Malvern, UK. For the experiments below, the D(50) value is specified. The D(50) value is the value at which 50% by volume of the particles are larger and 50% by volume of the particles are smaller than this value. The D(10) and D(90) values are defined accordingly.

Example 1

Batch

The following solution was prepared at 25° C.:
98.0 g of MMA
116.9 g of BA
49.0 g of St
105.6 g of HPMA
3.75 g of diphenylethene
34.4 g of dilauryl peroxide
188.9 g of Crelan® VPLS 2292

This solution was emulsified with 845.3 g of water and 60 g of a 10% strength Mowiol® 8–88 solution in water. The emulsifying step took place under nitrogen with a Dispermat® at 7000 rpm for 20 minutes. The Dispermat was from VMA-Gatzmann GmbH, D-51580 Reichsdorf and had a 5 cm toothed disc.

30 ml of this emulsion were charged to a moderately stirred (250 rpm) glass flask under nitrogen at 68° C. and subjected to initial polymerization. The remainder of the emulsion was metered in over a period of 60 minutes. After a total running time of 17 hours and 40 minutes, the reaction was stopped.

Example 2

Example 1 was repeated but with 0.72 g instead of 3.75 g of DPE and with a feed time of 100 minutes. The afterreaction time was shortened to 2 hours and 50 minutes.

Example 3

Example 1 was repeated but with 0.6 g of DPE. In the emulsifying step, 15.0 g of a 40% strength solution of Emulgator K30 were used in addition. The feed time was 2 hours and the afterreaction time was 165 minutes.

Example 4

Example 3 was repeated except that the amount of Emulgator K30 solution was 5.1 g.

Example 5

Batch

The following solution was prepared at 25° C.:
78.4 g of MMA
93.5 g of BA
32.2 g of St
84.5 g of HPMA
0.6 g of diphenylethene
27.5 g of dilauryl peroxide
155.8 g of Crelan® VPLS 2292

This solution was emulsified with 848.4 g of water, 48 g of a 10% strength Mowiol® 8–88 solution in water and 1.5 g of a 40% strength solution of Emulgator K30 in water. The emulsifying step took place under nitrogen with a Dispermat® at 7000 rpm for 20 minutes. The Dispermat® was from VMA-Gatzmann GmbH, D-51580 Reichsdorf (DE) and had a 5 cm toothed disc.

50 ml of this emulsion were charged to a moderately stirred (250 rpm) glass flask under nitrogen at 68° C. and subjected to initial polymerization. The remainder of the emulsion was metered in over a period of 120 minutes. After a reaction time of 100 minutes, the reaction was stopped.

Example 6

Example 5 was repeated but with 28.9 g of the 10% strength Mowiol® solution in water, with 7.2 g of the 40% strength K30 solution, and with an afterreaction of 120 minutes.

Example 7

Example 6 was repeated but with 2.9 g of the K30 solution. The amount of coagulum was 0 g.

Example 8

Example 1 was repeated but without DPE and with 37.0 g of the Mowiol® solution and 3.7 g of K30 solution. The feed time was 135 minutes and the afterreaction time was 120 minutes.

The amount of coagulum was 20 g.

Example 9

Example 8 was repeated but with only 7.4 g of dilauryl peroxide.

Example 10

Example 9 was repeated but with only 0.9 g of K30 solution.

Example 11

Example 10 was repeated but with 0.78 g of DPE, 7.4 g of azobisisobutyronitrile instead of dilauryl peroxide and 3.7 g instead of 0.9 g of the K30 solution. The feed time was 140 minutes and the afterreaction time was 250 minutes.

The amount of coagulum was 10 g.

Example 12

Example 11 was repeated but with 1.56 g of DPE. The afterreaction time was 420 minutes.

The amount of coagulum was 2 g.

Example 13

Example 12 was repeated but with the addition of 1.5 g of the cobalt compound in the emulsifying step.

The afterreaction time was 6 hours and 15 minutes.

Example 14

Example 13 was repeated but with 7.5 g of the cobalt compound.

Results

The particle size distributions of the batches are shown in the following table:

| Example | D(10) μm | D(50) μm | D(90) μm |
| --- | --- | --- | --- |
| 1 | 0.3 | 0.87 | 2.65 |
| 2 | 0.31 | 0.89 | 2.42 |
| 3 | 0.28 | 0.49 | 0.89 |
| 4 | 0.27 | 0.54 | 1.13 |
| 5 | 0.26 | 0.63 | 1.57 |
| 6 | 0.29 | 0.73 | 1.61 |
| 7 | 0.28 | 0.71 | 1.65 |
| 8 | 0.28 | 0.68 | 1.55 |
| 9 | 0.28 | 0.62 | 1.36 |
| 10 | 0.27 | 0.61 | 1.39 |

Following drying at room temperature followed by heat treatment at 150° C. for 80 minutes, all of the products form transparent and colorless films. The films were resistant to the solvents tetrahydrofuran and methyl ethyl ketone. Without the heat treatment, the resistance was not obtained.

The results indicate that by means of the microsuspension procedure it is possible to prepare polymers containing a blocked polyisocyanate. An advantage of this method is its environmental friendliness, since no organic solvents are used. It was also found that it is possible to prepare products having a broad particle size distribution, comprising particles having a diameter>1 μm. These products with broad particle size distributions exhibit lower viscosities than products with a monodisperse particle size distribution.

It was further found that the polymerization may be carried out with large amounts of initiator without the course of the polymerization becoming uncontrollable. This is much more difficult to carry out, for example, in bulk or solution when polymerization is almost 100%.

It was further found that the polymerization may take place in the presence of diphenylethylene. The use of DPE together with the increased amounts of peroxide leads to products having a low molecular weight, which is of interest for injection molding and for film formation with coating materials. The products may be crosslinked subsequently by heating. A further reduction in the molecular weight is possible with cobalt compounds.

It was also found that by using small amounts of diphenylethylene it was possible to increase the stability of the dispersions (Experiments 7 and 8 and also 11 and 12) (reduced formation of coagulum).

When polyvinyl alcohol is used as protective colloid, molding compounds or coatings are obtained in which the protective colloid does not migrate to the surface of the molding compound or coating material, because it has reacted with the isocyanate and has additionally be grafted during the polymerization.

We claim:

1. A process for preparing microsuspension polymers by
   (1) dispersing a mixture of components A1 to A4,
      a1: from 0.1 to 60% by weight of at least one free-radically polymerizable monomer A1 containing at least one functional group which is reactive with isocyanate groups (isocyanate-reactive functional group),
      a2: from 40 to 99.9% by weight of at least one further free-radically polymerizable monomer A2 containing no isocyanate-reactive functional group,
      a3: from 0 to 20% by weight of 1,1-diphenylethene or 1,1-diphenylethane A3,
      a4: from 0.1 to 100% by weight of at least one blocked polyisocyanate A4,
      in water using a protective colloid to form a dispersion having an average particle diameter of from 0.08 to 100 μm, and
   (2) polymerizing the droplets using from 0.1 to 20% by weight of at least one free-radical polymerization initiator, up to a conversion of at least 50% by weight,
   the amounts being based on the total weight of components A1 and A2, which gives 100% by weight.

2. A process as claimed in claim 1, wherein the monomer A1 contains at least one hydroxyl, primary or secondary amino, epoxy or carboxyl group.

3. A process as claimed in claim 1, wherein the monomer A2 is selected from $C_{1-16}$ alkyl (meth)acrylates, styrene, p-methyl styrene, α-methyl styrene, acrylonitrile and mixtures thereof.

4. A process as claimed in claim 1, wherein the blocked polyisocyanate A4 is a blocked cycloaliphatic polyisocyanate.

5. A process as claimed in claim 1, wherein the dispersion has an average particle diameter of from 0.3 to 10 μm.

6. A microsuspension polymer dispersion, comprising a microsuspension polymer, prepared by a process as claimed in claim 1, having an average particle size in the range from 0.3 to 100 μm.

7. A method of coating substrates by coating them with a microsuspension polymer dispersion prepared by a process as claimed in claim 1, which has an average particle size in the range from 0.3 to 100 μm, drying them and heating them to a temperature above 80° C.

* * * * *